United States Patent
Teng et al.

(10) Patent No.: US 11,821,754 B2
(45) Date of Patent: Nov. 21, 2023

(54) SENSOR CALIBRATION

(71) Applicant: QUALCOMM Incorporated, San Diego, CA (US)

(72) Inventors: Diyan Teng, Santa Clara, CA (US); Junsheng Han, Los Altos Hills, CA (US); Victor Kulik, San Jose, CA (US); Mehul Soman, San Jose, CA (US); Rashmi Kulkarni, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/675,725

(22) Filed: Feb. 18, 2022

(65) Prior Publication Data
US 2023/0266147 A1    Aug. 24, 2023

(51) Int. Cl.
*G01C 25/00* (2006.01)
*G01P 21/00* (2006.01)

(52) U.S. Cl.
CPC .............. *G01C 25/00* (2013.01); *G01P 21/00* (2013.01)

(58) Field of Classification Search
None
See application file for complete search history.

(56) References Cited

U.S. PATENT DOCUMENTS

| | | | |
|---|---|---|---|
| 2015/0192439 A1 | 7/2015 | Mihelich et al. | |
| 2020/0378793 A1* | 12/2020 | Xiao | ...................... G06N 3/045 |
| 2021/0190498 A1 | 6/2021 | Seth | |

OTHER PUBLICATIONS

International Search Report and Written Opinion—PCT/US2022/082432—ISA/EPO—dated Apr. 20, 2023.

* cited by examiner

*Primary Examiner* — Raul J Rios Russo
*Assistant Examiner* — Carl F. R. Tchatchouang
(74) *Attorney, Agent, or Firm* — QUALCOMM Incorporated

(57) ABSTRACT

Systems and techniques are described herein. For example, a process can include obtaining first sensor measurement data associated with a and second sensor measurement from one or more sensors. In some cases, the first measurement data can be associated with a first time and the second sensor measurement data can be associated with a second time occurring after the first time. In some aspects, the process includes determining that the first sensor measurement data and the second sensor measurement data satisfy at least one batching condition. In some examples, the process includes, based on determining that the first sensor measurement data and the second sensor measurement data satisfy the at least one batching condition, generating a sensor measurement data batch including the first sensor measurement data, the second sensor measurement data, and at least one target sensor measurement data. Ins examples the process includes outputting the sensor measurement data batch.

30 Claims, 8 Drawing Sheets

SENSOR CALIBRATION

FIELD

The present disclosure generally relates to sensor calibration. For example, aspects of the present disclosure are related to systems and techniques for calibrating inertial sensors.

BACKGROUND

Many devices and systems include sensors for estimating the pose of the device and/or system. For example, devices and systems can include an inertial measurement unit (IMU) that can integrate multi-axes, accelerometers, gyroscopes, and/or other sensors to provide the devices and systems with an estimate of the pose in physical space. Additional sensors can be used to determine aspects of the pose of devices and/or systems, such as barometric air pressure sensors to determine relative elevation changes, ultrasonic sensors to detector proximity to other objects, or the like.

In some cases, sensors used to determine the pose of devices and systems may utilize periodic calibration. In some cases, calibration can compensate for operational changes in the one or more sensors that would otherwise result in inaccurate pose estimates based on the uncalibrated sensor data.

BRIEF SUMMARY

Disclosed are systems, apparatuses, methods, and computer-readable media for processing sensor measurement data. According to at least one example, a method is provided for processing sensor measurement data. The method includes: obtaining first sensor measurement data associated with a first time from one or more sensors; obtaining second sensor measurement data associated with a second time from the one or more sensors, the second time occurring after the first time; determining that the first sensor measurement data and the second sensor measurement data satisfy at least one batching condition; based on determining that the first sensor measurement data and the second sensor measurement data satisfy the at least one batching condition, generating a sensor measurement data batch including the first sensor measurement data, the second sensor measurement data, and at least one target sensor measurement data, the at least one target sensor measurement data occurring between the first time and the second time; and outputting the sensor measurement data batch.

In another example, an apparatus for processing sensor measurement data is provided that includes one or more processors (e.g., implemented in circuitry). The one or more processors are configured to and can: obtain first sensor measurement data associated with a first time from one or more sensors; obtain second sensor measurement data associated with a second time from the one or more sensors, the second time occurring after the first time; determine, that the first sensor measurement data and the second sensor measurement data satisfy at least one batching condition; based on determine that the first sensor measurement data and the second sensor measurement data satisfy the at least one batching condition, generate a sensor measurement data batch including the first sensor measurement data, the second sensor measurement data, and at least one target sensor measurement data, the at least one target sensor measurement data occurring between the first time and the second time; and output the sensor measurement data batch.

In another example, a non-transitory computer-readable medium is provided that has stored thereon instructions that, when executed by one or more processors, cause the one or more processors to: obtain first sensor measurement data associated with a first time from one or more sensors; obtain second sensor measurement data associated with a second time from the one or more sensors, the second time occurring after the first time; determine, that the first sensor measurement data and the second sensor measurement data satisfy at least one batching condition; based on determine that the first sensor measurement data and the second sensor measurement data satisfy the at least one batching condition, generate a sensor measurement data batch including the first sensor measurement data, the second sensor measurement data, and at least one target sensor measurement data, the at least one target sensor measurement data occurring between the first time and the second time; and output the sensor measurement data batch.

In another example, an apparatus for processing sensor measurement data is provided. The apparatus includes: means for obtaining first sensor measurement data associated with a first time from one or more sensors; means for obtaining second sensor measurement data associated with a second time from the one or more sensors, the second time occurring after the first time; means for determining that the first sensor measurement data and the second sensor measurement data satisfy at least one batching condition; means for, based on determining that the first sensor measurement data and the second sensor measurement data satisfy the at least one batching condition, generating a sensor measurement data batch including the first sensor measurement data, the second sensor measurement data, and at least one target sensor measurement data, the at least one target sensor measurement data occurring between the first time and the second time; and means for outputting the sensor measurement data batch.

In some aspects, the method, apparatuses, and computer-readable medium described above further comprise: obtaining the sensor measurement data batch; based on the sensor measurement data batch, training a calibration model selector to select between two or more calibration policies.

In some aspects, the method, apparatuses, and computer-readable medium described above further comprise: obtaining calibrated measurement data corresponding to the sensor measurement data batch from a calibration model selected by the calibration model selector; determining an estimated orientation based on the calibrated measurement data; comparing the estimated orientation with a known orientation associated with the at least one batching condition; based on comparing the estimated orientation with the known orientation, adjusting at least one parameter of the calibration model selector.

In some aspects, the known orientation comprises a relative orientation change between the first time and the second time determined based on the first sensor measurement data and the second sensor measurement data and the estimated orientation comprises a relative orientation change determined based on the at least one target sensor measurement data.

In some aspects, the known orientation is determined at least in part based on at least one of a first angle of arrival and a first time of flight of a first radio frequency signal at the first time with at least one of a second angle of arrival and a second time of flight of a second radio frequency signal at the second time.

In some aspects, the known orientation is determined based on at least one of a charging station status, a computer vision algorithm, an angle of arrival of a radio frequency signal, a time of flight of a radio frequency signal, and a Global Navigation Satellite System (GNSS) status.

In some aspects, the first sensor measurement data and the second sensor measurement data correspond to a same sensor orientation.

In some aspects, the known orientation is determined based on a relative orientation change between the first time and the second time.

In some aspects, the method, apparatuses, and computer-readable medium described above further comprise: determining that the first sensor measurement data and the second sensor measurement data satisfy the at least one batching condition comprises determining a known orientation based on the first sensor measurement data and the second sensor measurement data.

In some aspects, the method, apparatuses, and computer-readable medium described above further comprise: obtaining third sensor measurement data associated with a third time from the one or more sensors, the third time occurring after the second time; obtaining fourth sensor measurement data associated with a fourth time from the one or more sensors, the fourth time occurring after the third time; determining that the third sensor measurement data and the fourth sensor measurement data satisfy an additional batching condition; based on determining that the third sensor measurement data and the fourth sensor measurement data satisfy the additional batching condition, generating an additional sensor measurement batch including the third sensor measurement data, the fourth sensor measurement data, and at least an additional target sensor measurement data between the third time and the fourth time; and outputting the additional sensor measurement batch.

According to at least one other example, a method is provided for processing sensor measurement data. The method includes: based on the first plurality of sensor measurements, performing a first calibration action on the first plurality of sensor measurements; based on the second plurality of sensor measurements, performing a second calibration action on the second plurality of sensor measurements, different from the first calibration action.

In another example, an apparatus for processing sensor measurement data is provided that one or more processors (e.g., implemented in circuitry). The one or more processors are configured to and can: based on the first plurality of sensor measurements, perform a first calibration action on the first plurality of sensor measurements; based on the second plurality of sensor measurements, perform a second calibration action on the second plurality of sensor measurements, different from the first calibration action.

In another example, a non-transitory computer-readable medium is provided that has stored thereon instructions that, when executed by one or more processors, cause the one or more processors to: based on the first plurality of sensor measurements, perform a first calibration action on the first plurality of sensor measurements; based on the second plurality of sensor measurements, perform a second calibration action on the second plurality of sensor measurements, different from the first calibration action.

In another example, an apparatus for processing sensor measurement data is provided. The apparatus includes: means for based on the first plurality of sensor measurements, performing a first calibration action on the first plurality of sensor measurements; means for based on the second plurality of sensor measurements, performing a second calibration action on the second plurality of sensor measurements, different from the first calibration action.

In some aspects, the method, apparatuses, and computer-readable medium described above further comprise: performing the first calibration action based on first one or more features associated with the first plurality of sensor measurements and performing the second calibration action on the second plurality of sensor measurements based on second one or more features associated with the second plurality of sensor measurements.

In some aspects, the first one or more features associated with the first plurality of sensor measurements and the second one or more features associated with the second plurality of sensor measurements each comprise a statistical feature of a respective inertial sensor measurement.

In some aspects, the statistical feature comprises one or more of a mean, a variance, and a standard deviation.

In some aspects, the first one or more features associated with the first plurality of sensor measurements and the second one or more features associated with the second plurality of sensor measurements are determined by a machine learning model.

In some aspects, a machine learning model is configured to select performing the first calibration action on the first plurality of sensor measurements based on the first one or more features associated with the first plurality of sensor measurements and the machine learning model selects performing the second calibration action on the second plurality of sensor measurements based on the second one or more features associated with the second plurality of sensor measurements.

In some aspects, the machine learning model is trained according to a method comprising, obtaining first sensor measurement data associated with a first time from one or more sensors; obtaining second sensor measurement data associated with a second time from the one or more sensors, the second time occurring after the first time; determining that the first sensor measurement data and the second sensor measurement data satisfy at least one batching condition; based on determining that the first sensor measurement data and the second sensor measurement data satisfy the at least one batching condition, generating a sensor measurement data batch including the first sensor measurement data, the second sensor measurement data, and at least one target sensor measurement data, the at least one target sensor measurement data occurring between the first time and the second time; based on the sensor measurement data batch, training a calibration model selector to select between two or more calibration actions, wherein the two or more calibration actions comprise the first calibration action and the second calibration action.

In some aspects, one or more of the apparatuses described above is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1A:
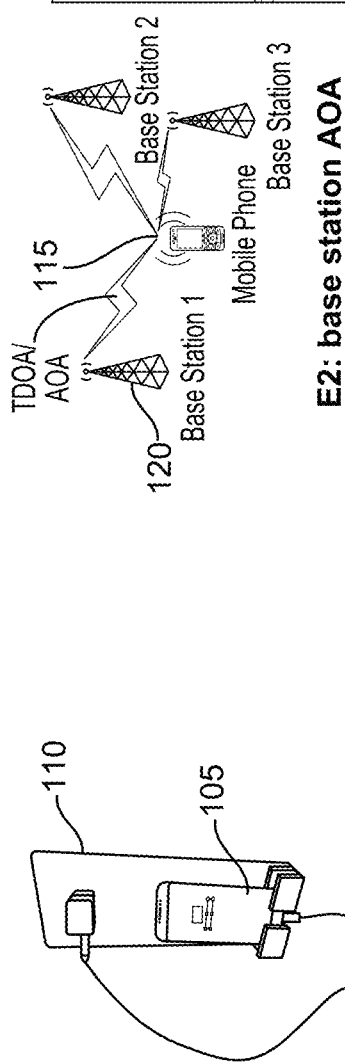
FIGS. 1A through 1D are illustrative examples of scenarios that can be used to batch sensor measurement data, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Inertial measurement sensors are increasingly used in electronic devices to provide pose information (e.g., orientation and/or translation). In some cases, the pose of the electronic device can be utilized by device features to provide an expected out to a user. In some cases, inaccurate measurements from uncalibrated or poorly calibrated inertial sensors can result in incorrect display of a user interface, inaccurate driving directions in a navigation application, inaccurate direction for spatial audio, or the like. Properly calibrating inertial sensors of a device can improve the accuracy of device features that depend on motion information from the inertial sensors to function.

In some cases, electronic devices can include a calibration model for calibrating the measurements of inertial sensors. One example source of measurement errors in an inertial sensor is a bias (e.g., a DC offset) in the measurements produced by a gyroscope. For the purposes of illustration, examples of the present disclosure are provided for sensor calibration of gyroscope bias. However, calibration using the systems and techniques can be used with other error sources and/or other types of sensors without departing from the scope of the present disclosure. One example calibration model for removing gyroscope bias requires a device to be stationary and in a fixed position. In some cases, the gyroscope bias can experience drift (e.g., due to temperature, aging, or the like) between stationary periods that can cause the gyroscope bias to produce incorrect measurements. In some cases, the ability of the device to detect that it is stationary can also depend on one or more additional inertial sensors (e.g., an accelerometer) that may also include calibration errors. In some examples, calibration errors of the one or more additional inertial sensors can result in misidentification of resting periods of the device, which can also lead to calibration errors.

Other example calibration techniques for removing gyroscope bias can be used when a device is in motion. For example, a tilt correction technique can compare changes a tilt angle of a device determined from gravitational component of an accelerometer measurement with expected changes in the tilt angle of the device based on a gyroscope measurement. In some implementations, e difference between the title angle determined from the accelerometer and the gyroscope can be attributed to gyroscope measurement bias. As discussed in more detail below, the title correction technique described above may rely on certain assumptions that do not hold under some conditions experienced by the electronic device.

Some devices include only one calibration model and/or can select between one calibration model and performing no calibration on gyroscope measurements. In some cases, the available calibration model and/or non-calibration may not be able to provide accurate calibration for at least a portion of the device's operation.

Systems and techniques are needed for accurately and more efficiently calibrating inertial sensors both during stationary periods and periods of motion. For example, incorrect measurements from uncalibrated or poorly calibrated inertial sensors can result in incorrect display of a user interface, inaccurate driving directions in a navigation application, inaccurate direction for spatial audio, or the like. Properly calibrating inertial sensors of a device can improve the accuracy of device features that depend on motion information from the inertial sensors to function.

Systems, apparatuses, processes (also referred to as methods), and computer-readable media (collectively referred to as "systems and techniques") are described herein for calibrating inertial sensors, such as gyroscopes, accelerometers, multi-axis sensors, or any combination thereof, based on data from one or more sensors. The data from the one or more sensors can include, without limitation, images, motion data, time of flight data, angle of arrival data, navigation data from satellite systems such as global navigation satellite system (GNSS) or the like (e.g., communications interface 840 of FIG. 8), and/or any combination thereof.

The systems and techniques can use known orientations of a device determined based on the information obtained from the one or more sensors to create batched sensor data (also referred to as "episodes" herein). In some aspects, the systems and techniques can create batched sensor data (or episodes) based on determining whether at least first sensor measurement data and second sensor measurement data satisfy one or more batching conditions. As used herein, a batching condition may be any condition for which precision, accuracy, processing efficiency, bandwidth efficiency, or any combination thereof may be gained for at least two sensors. In one example, if the at least first sensor measurement data and second sensor measurement data satisfy the one or more batching conditions, the systems and techniques can generate batched sensor data (or episodes). In one illustrative example, a batching condition can be satisfied when data from one sensor can be used as a ground truth reference for verifying measurements captured by a different sensor.

In some cases, the episodes can be used as ground truth data for training parameters (e.g., weights, biases, and/or other parameters) of a machine learning model. In some examples, the machine learning model can be trained to select between available calibration techniques to provide the best calibration result for a group of episodes of sensor data in a training data set. After training with the group of episodes of the training data set, the trained machine learning model can be output as a calibration policy engine. During inference (e.g., after the calibration policy engine is trained), the calibration policy engine can receive raw sensor data from the sensor to be calibrated and select a calibration model for calibrating the sensor data.

In some examples, a storage or memory device (e.g., as part of the sensor calibration system) can be used to store features extracted from the sensor measurement data. In some cases, the storage or memory device can store features extracted from a threshold number of sensor measurements (e.g., features extracted from five sensor measurements, six sensor measurements, ten sensor measurements, or any other number of sensor measurements). In some implementations, the storage or memory device can store features extracted from the measurements included in episodes batched by a batching engine. The features input to the data batching engine 204, calibration policy engine 208 and/or training engine 212 can be obtained from memory or storage device (e.g., from a buffer).

The sensor calibration systems and techniques described herein can calibrate inertial motion sensors using different calibration techniques at different times. In some cases, the calibration model can be selected by a calibration policy engine. In some cases, the calibration policy engine can be a machine learning model (e.g., a neural network). Using the systems and techniques, ground truth data can be generated by batching raw sensor data into batches of sensor data (also referred to herein as episodes). In some cases, the episodes can be used as ground truth data for training the calibration policy engine to select between available calibration techniques.

FIGS. 1A through 1D illustrate example scenarios (e.g., batching conditions) that can be used to generate batches of sensor data. FIG. 1A illustrates an example of a mobile device 105 charging in a wall mounted charging cradle 110. In the illustrated example of FIG. 1A, the pose of the mobile device 105 each time it is connected and charging in the wall mounted charging cradle can be assumed to be the same. In the illustrated example of FIG. 1B, a device 115 (illustrated as a mobile phone) can determine its pose based on the time of flight and/or angle of arrival of radio frequency (RF) signals from radio frequency transmitters having known locations. In one illustrative example, the angle of arrival of RF signals from base stations of a cellular network can be used to determine the pose of the device 115. For example, if the device 115 detects an angle arrival α from a known base station 120 at a first time and the same angle of arrival α from the same known base station 120 at a second time, later than the first time, the orientation of the device 115 at the first time and the second time can be assumed to be the same.

Figure 1B:
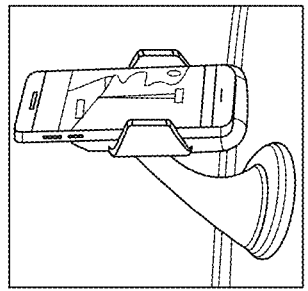
Figure 1D:
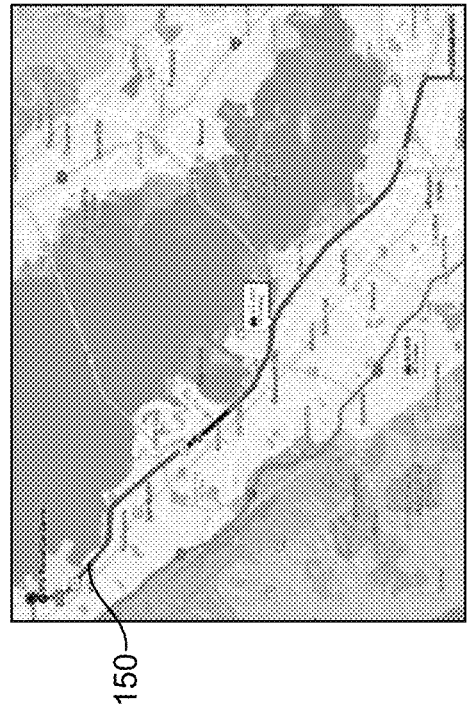
Figure 1C:
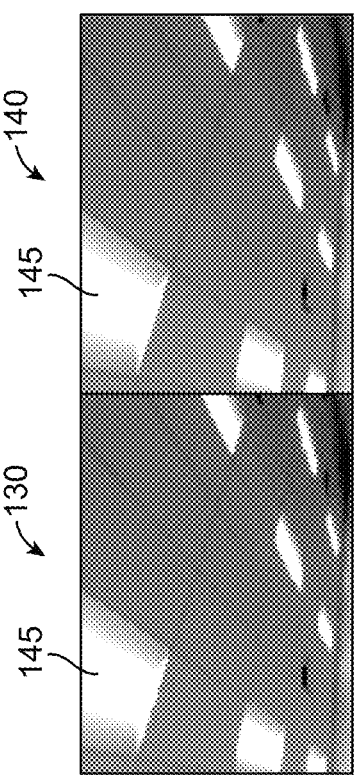

In some cases, batches of sensor data can be generated even when the orientation of the device at the beginning and end of the episodes is not identical. For example, FIG. 1C illustrates an example technique for using images of an at least partially overlapping scene obtained from one or more image sensors as a batching condition. FIG. 1C illustrates a first image 130 and a second image 140 that capture a portion of a ceiling with a recognizable lighting fixture 145 present in both images 130, 140. In some cases, rotation transformation between the two images can be determined (e.g., by detecting features in the images and warping one or both of the images so that the detected features align). In one illustrative example, feature detection and/or warping of the images can be performed using computer vision techniques. In some examples, based on the determined rotation transformation, the relative pose of the device can also be determined, and the known relationship between the poses of the device at the time of the first image and the time of the second image can for generating an episode. FIG. 1D illustrates another example technique that can utilize navigation data 150 (e.g., from a communications system of a device) to detect a known relationship between device orientations at two different times as the basis for batching an episode of sensor measurement data.

In some implementations, the ground truth data contained in the episodes can be used during training of the calibration policy engine so that the calibration policy engine can learn to select between the calibration models. In one illustrative example, sensor data included in an episode can be calibrated using a selected calibration model (e.g., selected by the calibration policy engine). In some cases, the calibrated data from the episode using the selected calibration model can be compared to the sensor measurement data of the episode. In some cases, the sensor calibration systems and techniques can use a path integral to compare the calibrated episode data to the episode data. In some cases, a calculated relative orientation change determined from the calibrated sensor data can be compared to a known relative orientation change used to batch the sensor data into an episode. Using the episode data, the systems and techniques can recognize differences between the calculated relative orientation change and the known relative orientation change can be used as a loss function during training of the calibration policy engine. In one illustrative example, the calibration policy engine can be trained using reinforcement learning.

While examples are described herein for calibrating gyroscope bias, the sensor calibration systems and techniques described herein can be used to calibrate errors sources in other types of inertial sensors (e.g., accelerometers) and/or other types of sensors that produce measurement data that can be batched to produce ground truth data for training a machine learning model to select between different calibration models.

Figure 2:
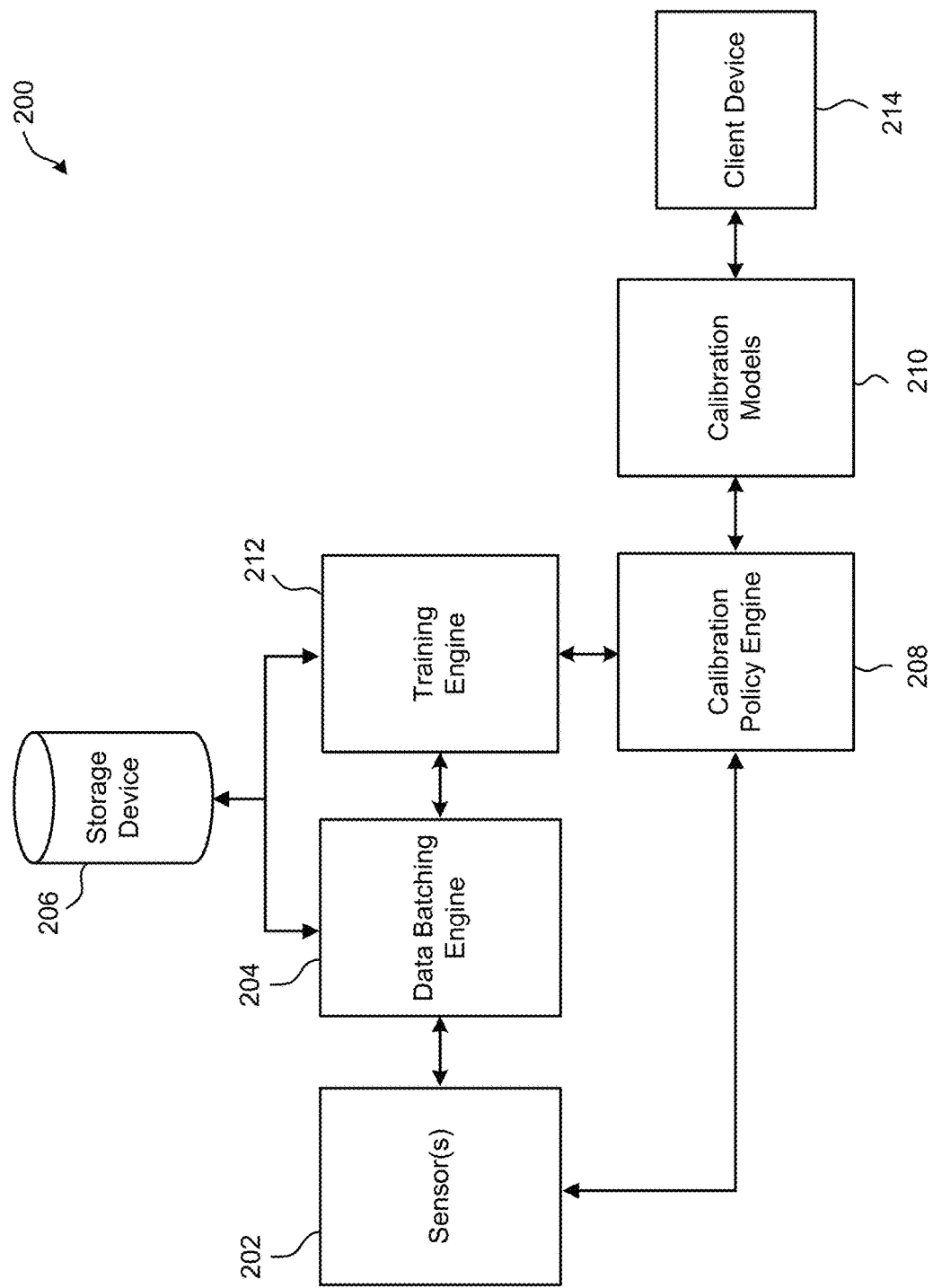
FIG. 2 is a block diagram illustrating an example of a sensor calibration system, in accordance with some examples.

Various aspects of the techniques described herein will be discussed below with respect to the figures. FIG. 2 is a block diagram illustrating an example sensor calibration system 200. The sensor calibration system 200 includes various components that are used to calibrate raw measurement data from one or more sensors. As shown, the components of the sensor calibration system 200 include one or more sensors 202, a data batching engine 204, a storage device 206, calibration policy engine 208, calibration models 210, a training engine 212, and one or more client devices 214.

In other implementations, the sensor calibration system 200 can be part of a mobile or stationary telephone handset (e.g., smartphone, cellular telephone, or the like), a server computer (e.g., in communication with a vehicle computing system), a desktop computer, a laptop or notebook computer, a tablet computer, a set-top box, a television, a camera, a display device, a digital media player, a video streaming device, a vehicle, or any other suitable electronic device. In some examples, the sensor calibration system 200 can include one or more wireless transceivers (or separate wireless receivers and transmitters) for wireless communications, such as cellular network communications, 802.11 Wi-Fi communications, wireless local area network (WLAN) communications, Bluetooth or other short-range communications, any combination thereof, and/or other communications. In some implementations, the components of the sensor calibration system 200 (e.g., the one or more sensors 202, the data batching engine 204, the storage device 206, calibration policy engine 208, calibration models 210, training engine 212, and the one or more client devices 214) can be part of the same computing device. In some implementations, the components of the sensor calibration system 200 can be part of two or more separate computing devices. In some cases, the sensor calibration system 200 can be implemented as part of the computing system 800 shown in FIG. 8.

While the sensor calibration system 200 is shown to include certain components, one of ordinary skill will appreciate that the sensor calibration system 200 can include more components or fewer components than those shown in FIG. 2. In some cases, additional components of the sensor calibration system 200 can include software, hardware, or one or more combinations of software and hardware. For example, in some cases, the sensor calibration system 200 can include one or more other sensors (e.g., image sensors, one or more inertial measurement units (IMUs), radars, light detection and ranging (LIDAR) sensors, audio sensors, etc.), one or more display devices, one or more other processing engines, one or more other hardware components, and/or one or more other software and/or hardware components that are not shown in FIG. 2. In some implementations, additional components of the sensor calibration system 200 can include and/or can be implemented using electronic circuits or other electronic hardware, which can include one or more programmable electronic circuits (e.g., digital signal processors (DSPs), microprocessors, microcontrollers, graphics processing units (GPUs), central processing units (CPUs), any combination thereof, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the sensor calibration system 200.

The one or more sensors 202 can capture information related to the pose of an electronic device. For example, the one or more sensors can include one or more IMUs. In some examples, the one or more IMUs can include accelerometers, gyroscopes, and/or other sensors to provide the device an estimate of its pose. The one or more sensors 202 can also include one or more image sensors. In some cases, images captured by the one or more image sensors that include at least a portion of a same scene can be aligned to determine a relative pose of the device. The one or more sensors can also transmit and/or receive navigational information (e.g., from GNSS and/or other navigational systems).

The sensor measurement data captured by one or more sensors 202 can be provided as input to the data batching engine 204, calibration policy engine 208 and/or calibration models 210. In some examples, when measurements from multiple sensors of the one or more sensors 202 are used to determine batching conditions, the measurements from the multiple sensors can be input and processed by the data batching engine 204, calibration policy engine 208, and/or calibration models 210.

In some examples, sensor calibration system 200 can include a plurality of calibration models 210 that can be used to calibrate raw sensor data from the one or more sensors 202. For the purposes of illustration, example calibration models are described for calibrating bias in a gyroscope included in a device. In the illustrative example, gyroscope measurements can be used to determine changes in the device orientation. In some examples, the gyroscope can be included in an IMU. The IMU may include other sensors, including but not limited to an accelerometer. Although the examples below are directed to specific types of sensors (e.g., gyroscopes, accelerometers, and/or other IMU sensors), the systems and techniques described herein can be applied to calibration of other types of sensors without departing from the scope of the present disclosure.

In one illustrative example, the calibration models 210 can include a zero rate correction calibration model. For example, a zero rate correction calibration model can measure the output of a gyroscope when a device is stationary. In some cases, because a stationary device should not register any motion in a gyroscope, measurement values output by a gyroscope while a device is stationary can be attributed to bias and/or other error sources. In some implementations, the zero rate correction calibration model can calculate a sample mean of a gyroscope output signal during each stationary period to generate a calibration correction. One potential drawback of the zero rate correction calibration model is that calibration drift (e.g., bias drift) that occurs between times when the device is stationary may not be fully compensated.

In some examples, the status of whether a device is stationary can be obtained from measurement data from the one or more sensor 202, excluding the sensor to be calibrated (e.g., the gyroscope). In one illustrative example, accelerometer data can be used to determine whether the device is stationary. For example, an accelerometer based thresholding can be used to detected when the accelerometer output is below a threshold level, and while the accelerometer output is below the threshold level, the device can be considered to be stationary. In some cases, if the accelerometer based thresholding erroneously indicates a period when the device is in motion as a stationary period, the gyroscope may be calibrated erroneously. In such an example, the gyroscope calibration may not be corrected until the next time the device is truly stationary and correctly calibrated. In another illustrative example, images from an image sensor can be compared to determine that the device pose has not changed.

Figure 3C:
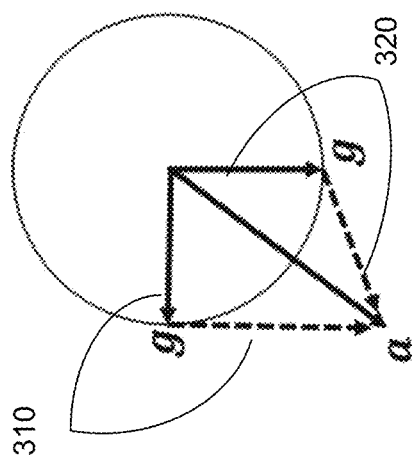
FIGS. 3A through 3C are diagrams illustrating ambiguity in accelerometer sensor measurements, in accordance with some examples.
Figure 3B:
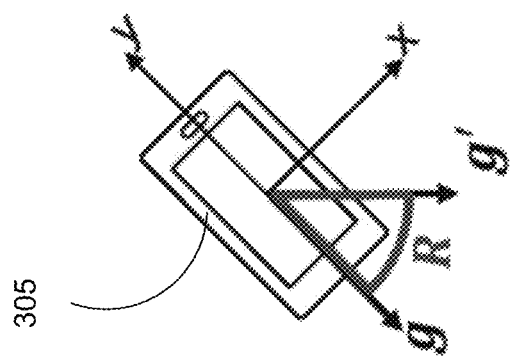
Figure 3A:
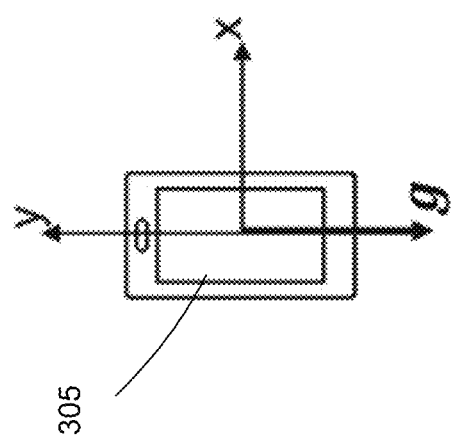

The calibration models 210 can also include models that operate while the gyroscope is in motion. In one illustrative FIGS. 3A through 3C provide an illustrative example of an acceleration measurement that can be output by an IMU. In one illustrative example, the IMU can include a six-axis IMU that can measure motion in six degrees of freedom. FIG. 3A illustrates a device 305 with ay-axis oriented in the direction of the long dimension of the device 305 and an x-axis orthogonal to the y-axis oriented in the direction of the short dimension of the device 305. The direction of gravity is indicated by the vector g oriented in the negative y-axis direction. FIG. 3B illustrates the device 305 rotated by an angle R. In the illustration of FIG. 3B, the direction of gravity is illustrated by the vector g', and the projection of gravitational acceleration onto the y-axis of the device 305 is illustrated as the vector g. In the illustrated example, the IMU included in the device 305 may not be able to differentiate between the contribution of gravity and another linear acceleration $a_{lin}$ along the y-axis. Equation (1) below illustrates components of the measured acceleration a of the device 305 along the y-axis direction:

$$a = a_{lin} + g \quad (1)$$

FIG. 3C illustrates that the measurement output by the example IMU in the device 305 has ambiguity due to the uncertainty in the contribution of gravity to the measured acceleration value a. FIG. 3C illustrates two different combinations 310, 320 of gravitational contributions g and a corresponding linear acceleration $a_{lin}$ illustrated by a dashed-line vector added to a corresponding gravitational contribution g. As illustrated in the example, the two combinations 310, 320 can produce the same measured acceleration despite the rotation angle of the device 305 (e.g., with g aligned to the y-axis as shown in FIGS. 3A and 3B) being completely different.

In one illustrative example, a tilt correction calibration model for an IMU of the device 305 as illustrated in FIGS. 3A through 3C can utilize the gravitational component g of the measured acceleration a for different measurements from the IMU along with rotation indicated by a gyroscope included in the IMU to calibration bias in the gyroscope measurement. An illustrative example tilt correction model is shown in Equation (2) below:

$$\min_{b} \| g_T - R_{T-\tau \to T}(\omega, b) \cdot g_{T-\tau} \| \quad (2)(2)$$

Where b is the bias of the gyroscope included in the IMU of device 305, ω is the output of the gyroscope (e.g., the measured rotation), $g_T$ is the of gravitational component of $a_{lin}$ at time T, $g_{T-\tau}$, is the gravitational component of $a_{lin}$ at time T−τ and $R_{T-\tau \to T}$ is the accumulated rotation matrix that applies the contribution of the gyroscope measurement components ω and b over the time interval τ.

As shown in FIG. 3C, and Equation (1), there is an ambiguity in the measured acceleration a and the value for g is not unique. In some implementations, the gravitational component g of the measured acceleration a can be assumed to be slow varying. In some examples, a Gaussian Markov assumption is also applied as part of the tilt correction model. In some cases, the Gaussian Markov assumption treats the linear acceleration term $a_{lin}$ has a zero mean gaussian distribution. In some cases, applying the assumptions above a Kalman Filtering technique can be applied to calibrate for the bias b of the gyroscope. However, in some cases, the assumptions that the measured acceleration a is slowly varying and/or that the linear acceleration term $a_{lin}$ has a zero mean gaussian distribution may not hold, resulting in the tilt correction model producing an inaccurate calibration for the bias b.

As noted above with respect to the zero state correction calibration model and the tilt correction model described with respect to FIGS. 3A through 3C, different calibration models may be suited to different operating conditions of a device (e.g., device 305 of FIGS. 3A through 3B). In some implementations, one of the calibration models 210 that can be selected by the 308 can include performing no calibration on the raw data from the gyroscope of the one or more sensors 202 and instead passing the raw data directly to the one or more client device 214. In some implementations, the calibration models 210 can include additional calibration models not described herein without departing from the scope of the present disclosure.

Returning to FIG. 2, data batching engine 204 can be used to generate batches of sensor measurement data (also referred to as episodes herein). As noted above, the data batching engine 204 can obtain raw sensor data from the one or more sensors 202. In some cases, the data batching engine 204 can in turn process the received data to determine when at least one batching condition is satisfied. FIGS. 1A through 1D described above provide illustrative examples of batching conditions that can be used by the data batching engine 204 to generate episodes. As noted above, as long as the orientation at both the beginning and end of an episode have a known relationship based on the measurement data from the one or more sensors 202, the data batching engine 204 can determine that at least one batching condition is satisfied. In some cases, there may be a gap in measurement data from the one or more sensors 202 included in different batched episodes. For example, measurement data captured by the one or more sensors 202 that is captured at a time that is not associated with any batching condition may not be included in any episode generated by the data batching engine 204. In some examples, two or more episodes may share common measurement data from the one or more sensors 202. In one illustrative example, a first episode associated with a first batching condition (e.g., using images of an at least partially overlapping scene) and a second episode associated with a second batching condition (e.g., determining pose based on the time of flight and/or angle of arrival of radio frequency (RF) signals from known locations) can include common measurement data from the one or more sensors 202. Although illustrative examples are provided in FIGS. 1A through 1D, other sensor measurements, in addition to or in combination with the examples of FIGS. 1A through 1D can be used by the data batching engine 204 to determine when at least one batching condition is satisfied.

Figure 4:
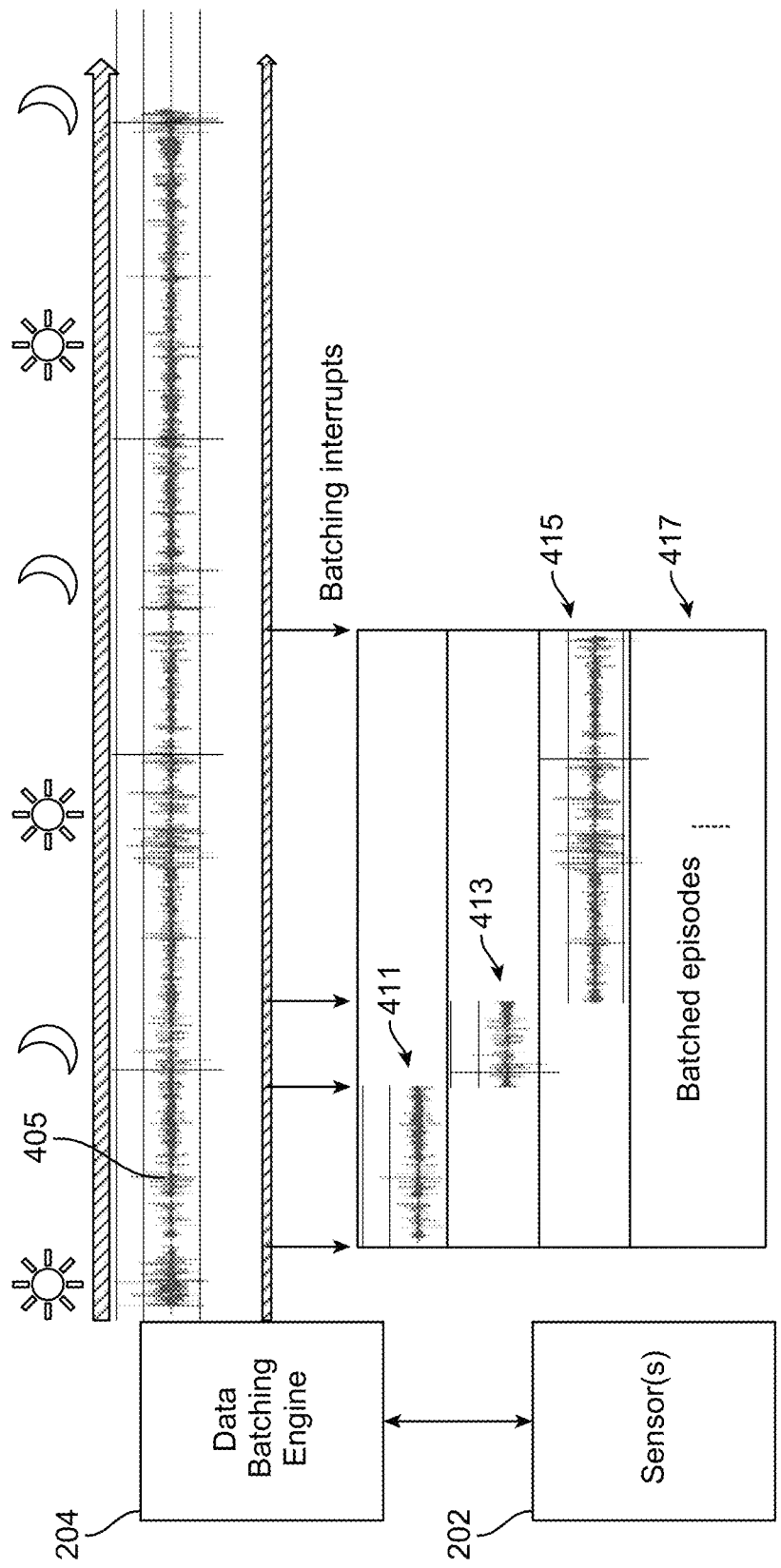
FIG. 4 is a diagram illustrating an example data batching process, in accordance with some examples.

FIG. 4 illustrates an example diagram of the batching sensor data into episodes that can be stored and subsequently used by the training engine 212 to train the calibration policy engine 208. In the illustration of FIG. 4, data batching engine 204 is shown obtaining inputs from the one or more sensors 202. The sensor measurements 405 obtained by the data batching engine 204 can include, without limitation, motion data (e.g., from an IMU), image data (e.g., from an image sensor), time of flight, angle of arrival, navigation data (e.g., from communications interface 840 of FIG. 8), or the like. As illustrated in FIG. 4, when the data batching engine 204 determines that a data batching condition is met, the sensor measurement data is batched into episodes 411, 413, 415, 417. In some examples, the episodes 411, 413, 415, 417 can be stored in the storage device 206 until the calibration policy engine 208 and/or training engine 212 are ready to perform additional training of the calibration policy engine 208 and/or training engine 212.

Calibration policy engine 208 (also referred to herein as a calibration model selector) can be a machine learning model trained to dynamically select between the calibration models 210 for calibrating inertial sensor measurement data. In some aspects, the calibration policy engine 208 can determine which of the calibration models 210 to select for calibration the gyroscope data based on the raw measurement data from the one or more sensors 202. In some implementations, the calibration policy engine 208 can determine which of the calibration models 210 to select for calibrating the gyroscope data based on the one or more features associated with the raw measurement data. As used herein, calibration of sensor measurement data by a calibration model 210 selected by the calibration policy engine 208 can also be referred to as performing a calibration action selected by the calibration policy engine 208. For example, the calibration policy engine 208 can obtain features based on one or more statistical measures of the raw measurement data from the one or more sensors 202. In one illustrative example, the one or more statistical measures can include a mean, variance, standard deviation, or any other statistical measure of the raw measurement data from the one or more sensors 202.

In some implementations, the data batching engine 204 can analyze data from the one or more sensors to detect that at least one batching condition is satisfied between measurements from the one or more sensors 202 at two different points in time. Example batching conditions are described with respect to FIGS. 1A through 1D above. In some cases, a batching condition can correspond to a device having a same orientation at two points in time. In some examples, a batching condition can correspond to a device having different orientations at two points in time. In some implementations, a relation between the different orientations can be determined from measurement data from the one or more sensors 202.

In some implementations, a feature extraction model (not shown) can be trained to extract information associated with the sensor measurement data from the inertial sensors. For instance, the feature extraction model can be trained to learn features of the sensor data on an episode by episode basis (e.g., to extract features from a sequence of measurements included in an episode). In some aspects, the feature extraction machine learning model can be included in one or more of the data batching engine 204, the calibration policy engine 208, the training engine 212, and/or any combination thereof.

The calibration policy engine 208 can be trained using any suitable machine learning training technique. In one illustrative example, weakly supervised learning techniques can be used to train the calibration policy engine 208. For instance, the calibration policy engine 208 can include one or more neural network models. A backpropagation training process can be performed to adjust the weights (and in some cases other parameters, such as biases) of the nodes of each of the neural networks. Backpropagation can include a forward pass, a loss function, a backward pass, and a weight update. The forward pass, loss function, backward pass, and parameter update is performed for one training iteration. In some cases, one training iteration can include a training data set including multiple episodes batched by data batching engine 204. The process can be repeated for the calibration policy engine 208 for a certain number of iterations for a training dataset until the weights of the parameters of the calibration policy engine 208 are tuned based on the group of batched episodes.

In some implementations, the training engine 212 can perform one or more training operations of training the calibration policy engine 208. For example, the 212 can perform at least one of updating weights of the parameters of the calibration policy engine 208, calculating the loss function associated with a calibration model 210 selected by the calibration policy engine 208 compared to ground truth data (e.g., the episodes included in the training dataset), and calculating a path integral using the output of the selected calibration model 210 to compare to the ground truth data.

In some implementations, the training engine 212 can include the parameters of the calibration policy engine 208. In such an example, during training, the parameters of the training engine 212 can be updated based on the training with the training dataset until the training is complete. In some aspects, after the training is complete, the training engine 212 can update the corresponding parameters of calibration policy engine 208. In some cases, the operations of the training engine 212 can be performed offline, thereby conserving power relative to performing calibration on sensor data in real-time.

In some cases, new groups of episodes can periodically be provided to the training engine 212 (e.g., from the data batching engine 204 and/or storage device 206) and the same process can be repeated for a certain number of iterations for each group of episodes until the weights of the parameters of the calibration policy engine 208 and/or 2122/ are further tuned based on each of the new groups of episodes. In some aspects, after a training dataset has been used to train the 208/ and/or training engine 212, the training dataset can be discarded and not used in future training iterations. In some aspects, at least a portion of a training dataset (e.g., some or all of the episodes included in the training dataset) can be re-used during multiple iterations and/or combined with other groups of episodes to be used as training data for the 208/ and/or training engine 212.

During inference (once the calibration policy engine 208 and/or training engine 212 has processed a training set of batched episodes and adjusted the weights and/or biases of the calibration policy engine 208 have been updated), the calibration policy engine 208 can receive sensor measurements (e.g., inertial sensor measurement) captured by the one or more sensors 202. In some cases, the feature extraction model (not shown) can extract features from the sensor measurements and provide the extracted features as input to the calibration policy engine 208. Based on the raw sensor measurements and/or the extracted features, the calibration policy engine 208 can select between calibration models 210 in real-time as measurement data from the one or more sensors 202 is received.

In one illustrative example, the training data used to train the neural network of the calibration policy engine 208 can include episodes of sensor measurement data (e.g., in a weakly supervised training process). As noted above, training of the calibration policy engine 208 can include operations performed by the training engine 212 and/or can include training parameters of the training engine 212 and subsequently updating of parameters of the calibration policy engine 208 after training is complete. However, with respect to the examples of Equations (3) and (4) below, the training will be described in terms of training the calibration policy engine 208. In some cases, a forward pass can include passing an episode through the neural network of the calibration policy engine 208. The parameters of the neural network may be initially randomized before the neural network is trained. For example, the calibration policy engine 208 may initially select randomly between the calibration models 210. For a first training iteration for the neural network system, the output may include values that do not give preference to any particular calibration model, as the weights have not yet been calibrated. After the first training iteration using the initial weights, the calibration model 210 selected by the calibration policy engine 208 will likely not be the calibration model that provides the lowest bias error for the inertial sensor measurement data (e.g., the gyroscope data) included in the episode.

A loss function can be used to analyze error in the output of the calibration model 210 selected by the calibration policy engine 208. Equation (3) provides an illustrative example of a path integral that can be applied to the output of the calibration models 210 selected by the calibration policy engine 208 and subsequently provided a loss function.

$$q_{t+1} = \frac{q_t}{\|q_t\|} + \frac{1}{2} \cdot \frac{q_t}{\|q_t\|} * [0 \omega_x \omega_y \omega_z] \cdot \Delta_t \qquad (3)$$

Where $q_t$ is a quaternion representing the orientation of the gyroscope at time $$t, \frac{q_t}{\|q_t\|}$$

is the normalized quaternion at time t, and $[0\ \omega_x\ \omega_y\ \omega_z]$ is a rotation vector corresponding to the gyroscope measurement at time t, and $\Delta_t$ is a time interval between the measurement times t and t+1. In some cases, applying Equation (3) to each incremental sensor measurement included in an episode can calculate the motion path indicated by the calibrated sensor data from the selected calibration models 210 from the beginning of the episode to the end of the episode. The calculated orientation based on the selected calibration model 210 can is shown in Equation (4)

$$\min_{\mathcal{A}} \sum_{e \in episodes} \|q_j^e - rot(q_i^e, \omega_{i \to j}, b_{i \to j}(\mathcal{A}_{i \to j}))\|^2 \qquad (4)(4)$$

Where $\mathcal{A}$ is the action drawn from the set of possible calibration models 210 selected by the calibration policy engine 208, $q_j^e$ is the quaternion associated with the final measurement of the episode e, $q_i^e$ is the quaternion associated with the initial measurement of the episode e, and $rot(q_i^e, \omega_{i \to j}, b_{i \to j}(\mathcal{A}_{i \to j}))$ is a cumulative rotation of the quaternion $q_i^e$, as a function of the cumulative gyroscope measurement $\omega_{i \to j}$, and cumulative gyroscope bias $b_{i \to j}$ as a function of the selected calibration model 210 applied over the episode ($\mathcal{A}_{i \to j}$). In some examples, training of the calibration policy engine 208 can include minimizing the loss function over all of the episodes included in a training dataset.

In the example of Equation (4), the loss function takes the form of a mean squared error (MSE), defined as $$E_{total} = \sum \frac{1}{2}(target - output)^2.$$

The MSE calculates the sum of one-half times the actual answer (e.g., the ground truth obtained from the episode) minus the predicted (output) answer squared. The loss (or error) may be high for the first or initial training input frames, since the actual output values (features extracted by the network for those input frames) may be much different than the predicted output (the features provided by the label for those input frames). A goal of training is to minimize the amount of loss for the predicted output. The neural network can perform a backward pass by determining which inputs (weights) most contributed to the loss of the neural network and can adjust the weights so the loss decreases and is eventually minimized. A derivative of the loss with respect to the weights (denoted as dL/dW, where W are the weights at a particular layer) can be computed to determine the weights that most contributed to the loss of the neural network. For example, the weights can be updated so they change in the opposite direction of the gradient. The weight update can be denoted as $$w = w_k - \eta \frac{dL}{dW},$$

where w denotes a weight, $w_k$ denotes the initial weight, and $\eta$ denotes a learning rate. The learning rate can be set to any suitable value, with a high learning rate indicating larger weight updates and a lower value indicating smaller weight updates. The neural network of the calibration policy engine 208 can continue to be trained in such a manner until a desired output is achieved.

In the example of Equation (4), the loss function can be used for batching conditions where the initial quaternion and the final quaternion are expected to have a same orientation (e.g., as shown in FIG. 1A). In some cases, an additional term can be included in the loss function as shown in Equation (5) below:

$$\min_{\mathcal{A}} \sum_{e \in episodes} \|q_j^e - rot(q_i^e, \omega_{i \to j}, b_{i \to j}(\mathcal{A}_{i \to j})) - rot(\omega_{offset})\|^2 \qquad (5)(5)$$

Where $rot(\omega_{offset})$ is an additional rotation component corresponding to the known offset between the initial orientation of the device and the final orientation of the device associated with the episode.

Returning to FIG. 2, during inference, one or more client devices 214 can obtain calibrated sensor measurement data (e.g., from inertial sensors) that are provided from a dynamically selected calibration model of the calibration models 210 by the calibration policy engine 208.

In some cases, after a predetermined condition is met, the calibration policy engine 208 and/or training engine 212 can be calibrated again with a training dataset that includes one or more additional episodes batched by the data batching engine 204. In some cases, the calibration model 210 selected by the calibration policy engine 208 can be improved periodically through additional training.

As noted above, the sensor calibration system 200 and related techniques described herein can allow a sensor calibration system to accurately calibrate inertial sensors of a device under many different conditions (e.g., motion, non-motion, fluctuating temperatures, etc.). For instance, using the sensor calibration system 200, a device can perform sensor calibration using episode batched based on time of flight and/or angle of arrival information obtained from a cellular base station. In some cases, the data batching engine 204 can apply batching conditions for situations where the device orientation is the same at the beginning and end of an episode. In some examples, the data batching engine 204 can apply batching conditions for situations where the device orientation is different at the beginning and end of an episode, but the orientations at the beginning and end of the episode have an known relationship.

In some cases, using the episodes from the data batching engine 204, a calibration policy engine 208 can be trained to select between available calibration models 210 based on features of the sensor data from the inertial sensors. In some implementations, a feature extraction model can include a machine learning model (e.g., a neural network) trained to extract features from the sensor data that improve the quality of calibration model selection by the calibration policy engine 208. In some implementations, the features of the inertial sensor data can include one or more statistical of the inertial sensor data such as mean, variance, standard deviation, or the like.

In some implementations, training the calibration policy engine 208 can include determining a loss function. In some examples, training the calibration policy engine 208 can include adjusting weights of the calibration policy engine 208 to minimize the loss function for a training dataset that can include multiples episodes batched by the data batching engine 204. In some aspects, the loss function and/or the weight updates for the calibration policy engine 208 can be determined by a training engine 212. In some implementations, the training engine 212 can include parameters of the calibration policy engine 208 and the training engine can update the calibration policy engine 208 after training using the calibration dataset.

During inference the calibration policy engine 208 can select between available calibration models 210 to select a calibration model that is most likely to produce the lowest error based on the training. In comparison, systems that include a single model sensor calibration may provide accurate sensor data for only a limited subset of operating conditions of the device, or not at all. Accordingly, the systems and techniques described herein can be utilized to improve inertial sensor calibration.

In addition to use for calibrating inertial sensors, the systems and techniques described herein can also be used to calibrate other types of sensors. For example, if the quantity being measured by the other types of sensors can be represented by a path integral, then a data batching engine similar to data batching engine 204 can be used to batch measurement data from the other types of sensors into episodes. In some cases, the exact for of the loss function may change, but the principles described herein can be similarly applied.

Figure 5:
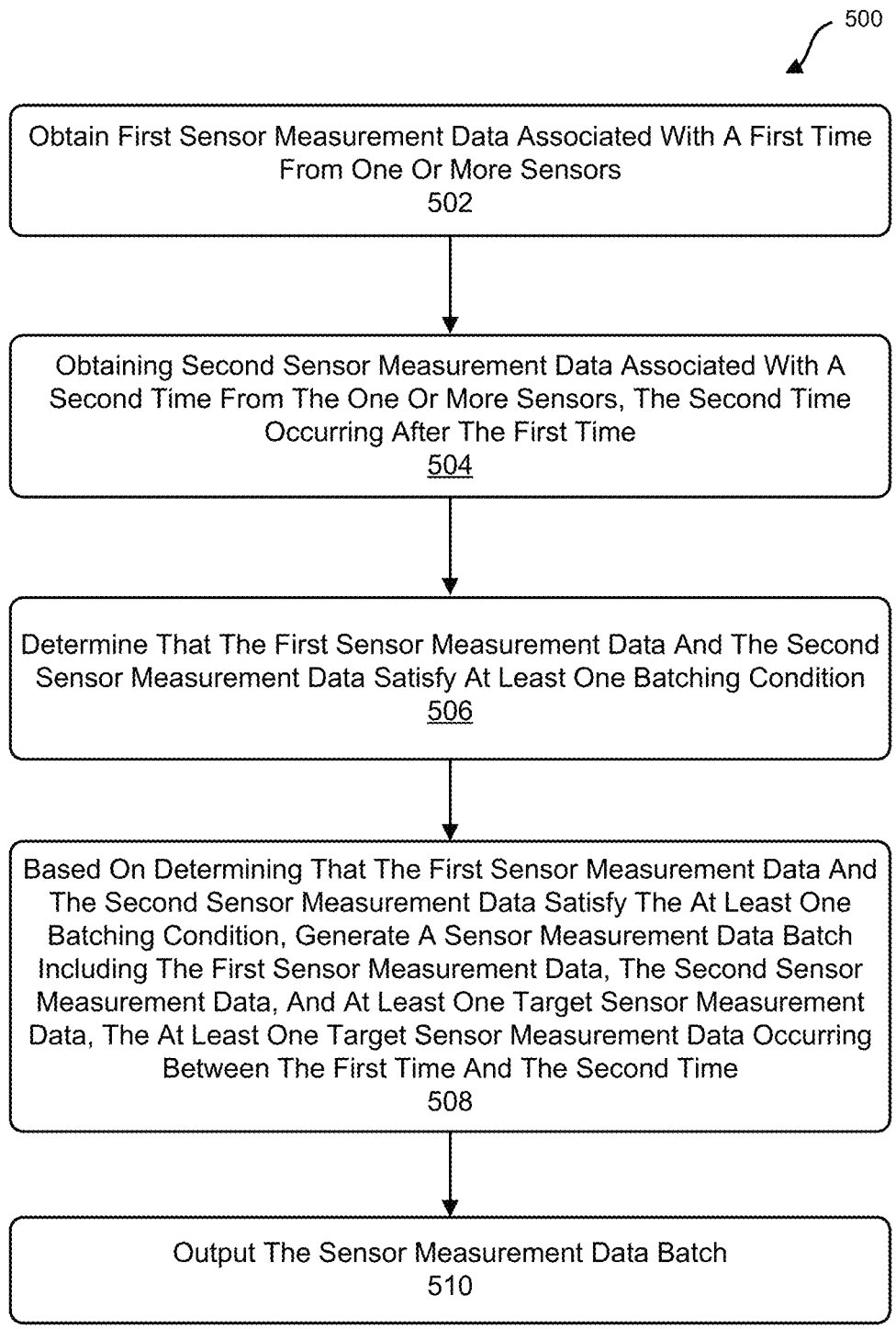
FIG. 5 is a flow diagram illustrating an example of a process for processing one or more frames, in accordance with some examples.

FIG. 5 is a flow diagram illustrating an example of a process 500 of processing sensor measurement data. At block 502, the process 500 includes obtaining first sensor measurement data associated with a first time from one or more sensors. At block 504, the process 500 includes obtaining second sensor measurement data associated with a second time from the one or more sensors. In some cases, the second time occurs after the first time.

At block 506, the process 500 includes determining that the first sensor measurement data and the second sensor measurement data satisfy at least one batching condition. At block 508, the process 500 includes based on determining that the first sensor measurement data and the second sensor measurement data satisfy the at least one batching condition, generating a sensor measurement data batch. In some examples, the sensor measurement batch includes the first sensor measurement data, the second sensor measurement data, and at least one target sensor measurement data. In some cases, the at least one target sensor measurement data occurs between the first time and the second time At block 510, the process 500 includes outputting the sensor measurement data batch. In some cases, the sensor measurement data batch can be output to a storage device, (e.g., storage device 206 of FIG. 2).

In some cases, the process 500 includes obtaining third sensor measurement data associated with a third time from the one or more sensors. In some cases, the third time occurs after the second time. In some examples, the process 500 includes obtaining fourth sensor measurement data associated with a fourth time from the one or more sensors. In some aspects, the fourth time occurring after the third time. In some examples, the process 500 includes determining that the third sensor measurement data and the fourth sensor measurement data satisfy an additional batching condition. In some examples the process 500 includes, based on determining that the third sensor measurement data and the fourth sensor measurement data satisfy the additional batching condition, generating an additional sensor measurement batch including the third sensor measurement data, the fourth sensor measurement data, and at least an additional target sensor measurement data between the third time and the fourth time. In some cases, the process 500 includes outputting the additional sensor measurement batch. In some cases, the additional sensor memory data batch can be output to a storage device (e.g., storage device 206 of FIG. 2).

In some examples, the process 500 includes obtaining the sensor measurement data batch (e.g., from storage device 206 of FIG. 2) and, based on the sensor measurement data batch, training a calibration model selector to select between two or more calibration policies. In some implementations, training the calibration model selector includes obtaining calibrated measurement data corresponding to the sensor measurement data batch from a calibration model selected by the calibration model selector; determining an estimated orientation based on the calibrated measurement data; comparing the estimated orientation with a known orientation associated with the at least one batching condition; and based on comparing the estimated orientation with the known orientation, adjusting at least one parameter of the calibration model selector. In some cases, the known orientation comprises a relative orientation change between the first time and the second time determined based on the first sensor measurement data and the second sensor measurement data and the estimated orientation comprises a relative orientation change determined based on the at least one target sensor measurement data. In some examples, the known orientation is determined at least in part based on at least one of a first angle of arrival and a first time of flight of a first radio frequency signal at the first time with at least one of a second angle of arrival and a second time of flight of a second radio frequency signal at the second time. In some implementations, the known orientation is determined based on at least one of a charging station status, a computer vision algorithm, an angle of arrival of a radio frequency signal, a time of flight of a radio frequency signal, and a Global Navigation Satellite System (GNSS) status. In some aspects, determining that the first sensor measurement data and the second sensor measurement data satisfy the at least one batching condition comprises determining a known orientation based on the first sensor measurement data and the second sensor measurement data. In some examples, the first sensor measurement data and the second sensor measurement data correspond to a same sensor orientation (e.g., the mobile device charging in wall mounted charging cradle 110 of FIG. 1A). In some cases, the known orientation is determined based on a relative orientation change between the first time and the second time. For example, the known orientation can be determined based on a relative orientation change associated with time of flight and/or angle of arrival as illustrated in FIG. 1B, image data as illustrated in FIG. 1C, navigation data as illustrated in FIG. 1D, any other sensor measurement capable of providing relative orientation change information, and/or any combination thereof.

In some examples, the processes described herein (e.g., process 500 and/or other process described herein) may be performed by a computing device or apparatus. In one example, one or more of the processes can be performed by the sensor calibration system 200 of FIG. 2. In another example, one or more of the processes can be performed by the computing system 800 shown in FIG. 8. For instance, a computing device with the computing system 800 shown in FIG. 8 can include the components of the sensor calibration system 200 and can implement the operations of the process 500 of FIG. 5 and/or other process described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 500 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 500 is illustrated as a logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
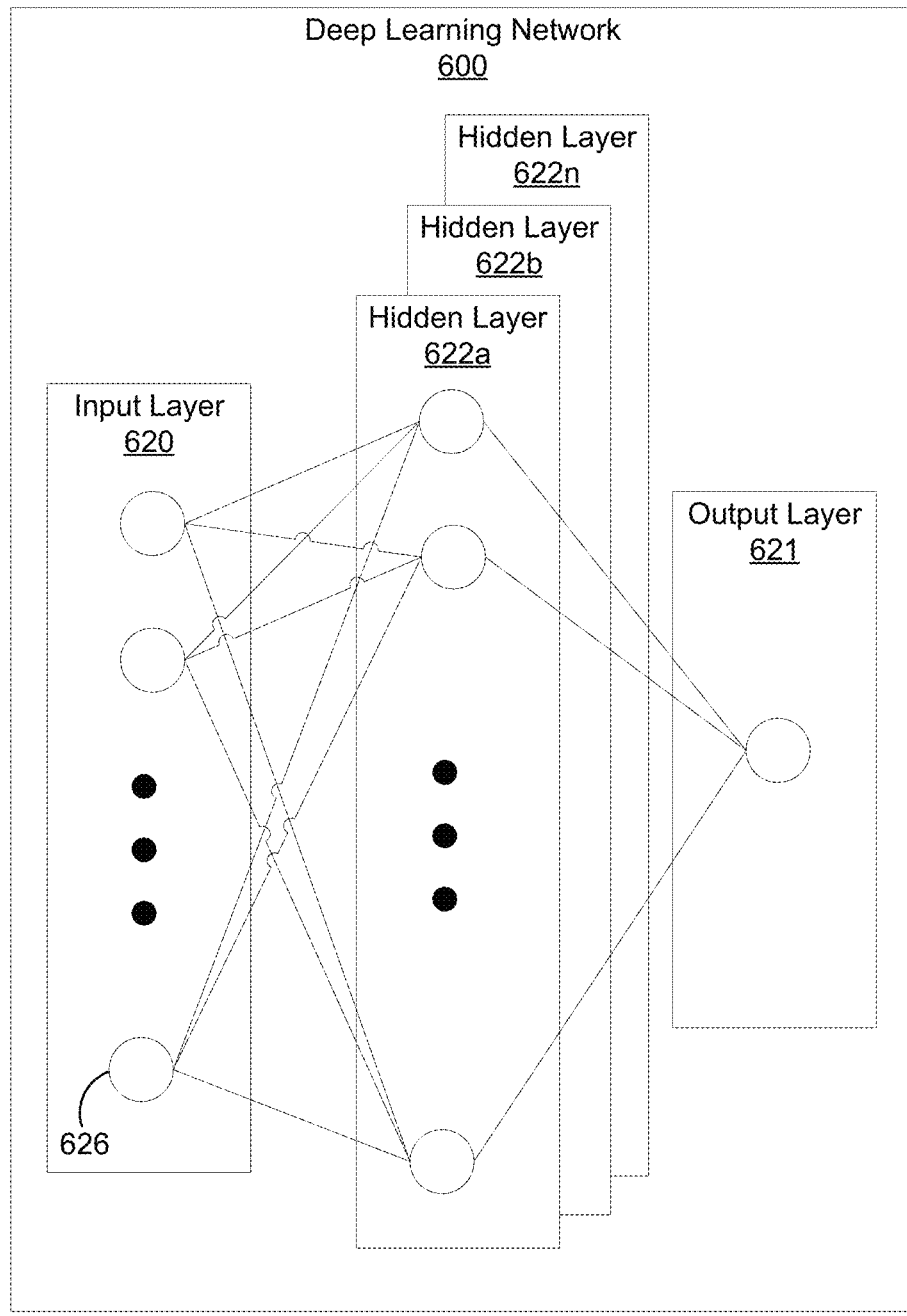
FIG. 6 is a block diagram illustrating an example of a deep learning network, in accordance with some examples.

As noted above, various aspects of the present disclosure can use machine learning models or systems. FIG. 6 is an illustrative example of a deep learning neural network 600 that can be used to implement the machine learning based feature extraction and/or calibration model selection described above. An input layer 620 includes input data. The illustrative example of FIG. 6 is described in terms of training feature recognition for features detected in video frames, but similar techniques can also be applied to feature extraction from sensor measurements and/or calibration model selection. In one illustrative example, the input layer 620 can include data representing the pixels of an input video frame. The neural network 600 includes multiple hidden layers 622*a*, 622*b*, through 622*n*. The hidden layers 622*a*, 622*b*, through 622*n* include "n" number of hidden layers, where "n" is an integer greater than or equal to one. The number of hidden layers can be made to include as many layers as needed for the given application. The neural network 600 further includes an output layer 621 that provides an output resulting from the processing performed by the hidden layers 622*a*, 622*b*, through 622*n*. In one illustrative example, the output layer 621 can provide a classification for an object in an input video frame. The classification can include a class identifying the type of activity (e.g., looking up, looking down, closing eyes, yawning, etc.).

The neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622*a*. For example, as shown, each of the input nodes of the input layer 620 is connected to each of the nodes of the first hidden layer 622*a*. The nodes of the first hidden layer 622*a* can transform the information of each input node by applying activation functions to the input node information. The information derived from the transformation can then be passed to and can activate the nodes of the next hidden layer 622*b*, which can perform their own designated functions. Example functions include convolutional, up-sampling, data transformation, and/or any other suitable functions. The output of the hidden layer 622*b* can then activate nodes of the next hidden layer, and so on. The output of the last hidden layer 622*n* can activate one or more nodes of the output layer 621, at which an output is provided. In some cases, while nodes (e.g., node 626) in the neural network 600 are shown as having multiple output lines, a node has a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622*a*, 622*b*, through 622*n* in order to provide the output through the output layer 621. In an example in which the neural network 600 is used to identify activities being performed by a driver in frames, the neural network 600 can be trained using training data that includes both frames and labels, as described above. For instance, training frames can be input into the network, with each training frame having a label indicating the features in the frames (for the feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 600 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 600 is trained well enough so that the weights of the layers are accurately tuned.

For the example of identifying objects in frames, the forward pass can include passing a training frame through the neural network 600. The weights are initially randomized before the neural network 600 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 600, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 600 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 600 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 600 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, a deep belief nets (DBNs), a Recurrent Neural Networks (RNNs), among others.

Figure 7:
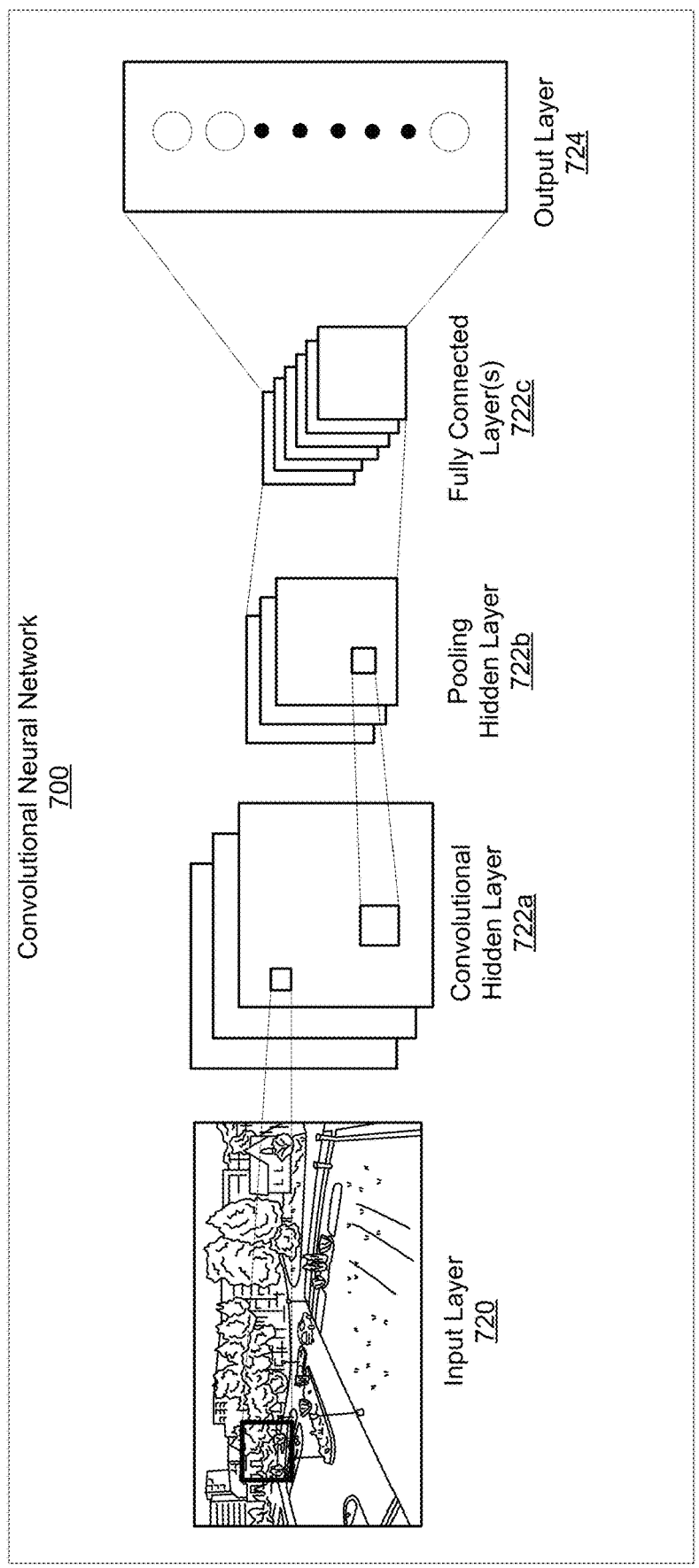
FIG. 7 is a block diagram illustrating an example of a convolutional neural network, in accordance with some examples.

FIG. 7 is an illustrative example of a convolutional neural network (CNN) 700. The input layer 720 of the CNN 700 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 722*a*, an optional non-linear activation layer, a pooling hidden layer 722*b*, and fully connected hidden layers 722*c* to get an output at the output layer 724. While only one of each hidden layer is shown in FIG. 7, one of ordinary skill will appreciate that multiple convolutional hidden layers, non-linear layers, pooling hidden layers, and/or fully connected layers can be included in the CNN 700. As previously described, the output can indicate a single class of an object or can include a probability of classes that best describe the object in the image.

The first layer of the CNN 700 is the convolutional hidden layer 722*a*. The convolutional hidden layer 722*a* analyzes the image data of the input layer 720. Each node of the convolutional hidden layer 722*a* is connected to a region of nodes (pixels) of the input image called a receptive field. The convolutional hidden layer 722*a* can be considered as one or more filters (each filter corresponding to a different activation or feature map), with each convolutional iteration of a filter being a node or neuron of the convolutional hidden layer 722*a*. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 722*a*. Each connection between a node and a receptive field for that node learns a weight and, in some cases, an overall bias such that each node learns to analyze its particular local receptive field in the input image. Each node of the hidden layer 722*a* will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 722*a* is due to each node of the convolutional layer being applied to its corresponding receptive field. For example, a filter of the convolutional hidden layer 722*a* can begin in the top-left corner of the input image array and can convolve around the input image. As noted above, each convolutional iteration of the filter can be considered a node or neuron of the convolutional hidden layer 722*a*. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 722*a*. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 722*a*.

The mapping from the input layer to the convolutional hidden layer 722*a* is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 722*a* can include several activation maps in order to identify multiple features in an image. The example shown in FIG. 7 includes three activation maps. Using three activation maps, the convolutional hidden layer 722*a* can detect three different kinds of features, with each feature being detectable across the entire image.

In some examples, a non-linear hidden layer can be applied after the convolutional hidden layer 722*a*. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 700 without affecting the receptive fields of the convolutional hidden layer 722*a*.

The pooling hidden layer 722*b* can be applied after the convolutional hidden layer 722*a* (and after the non-linear hidden layer when used). The pooling hidden layer 722*b* is used to simplify the information in the output from the convolutional hidden layer 722*a*. For example, the pooling hidden layer 722*b* can take each activation map output from the convolutional hidden layer 722*a* and generates a condensed activation map (or feature map) using a pooling function. Max-pooling is one example of a function performed by a pooling hidden layer. Other forms of pooling functions be used by the pooling hidden layer 722*a*, such as average pooling, L2-norm pooling, or other suitable pooling functions. A pooling function (e.g., a max-pooling filter, an L2-norm filter, or other suitable pooling filter) is applied to each activation map included in the convolutional hidden layer 722*a*. In the example shown in FIG. 7, three pooling filters are used for the three activation maps in the convolutional hidden layer 722*a*.

In some examples, max-pooling can be used by applying a max-pooling filter (e.g., having a size of 2×2) with a stride (e.g., equal to a dimension of the filter, such as a stride of 2) to an activation map output from the convolutional hidden layer 722*a*. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 722*a* having a dimension of 24×24 nodes, the output from the pooling hidden layer 722*b* will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 700.

The final layer of connections in the network is a fully-connected layer that connects every node from the pooling hidden layer 722b to every one of the output nodes in the output layer 724. Using the example above, the input layer includes 28×28 nodes encoding the pixel intensities of the input image, the convolutional hidden layer 722a includes 3×24×24 hidden feature nodes based on application of a 5×5 local receptive field (for the filters) to three activation maps, and the pooling hidden layer 722b includes a layer of 3×12×12 hidden feature nodes based on application of max-pooling filter to 2×2 regions across each of the three feature maps. Extending this example, the output layer 724 can include ten output nodes. In such an example, every node of the 3×12×12 pooling hidden layer 722b is connected to every node of the output layer 724.

The fully connected layer 722c can obtain the output of the previous pooling hidden layer 722b (which should represent the activation maps of high-level features) and determines the features that most correlate to a particular class. For example, the fully connected layer 722c layer can determine the high-level features that most strongly correlate to a particular class, and can include weights (nodes) for the high-level features. A product can be computed between the weights of the fully connected layer 722c and the pooling hidden layer 722b to obtain probabilities for the different classes. For example, if the CNN 700 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 724 can include an M-dimensional vector (in the prior example, M=10). M indicates the number of classes that the CNN 700 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 8:
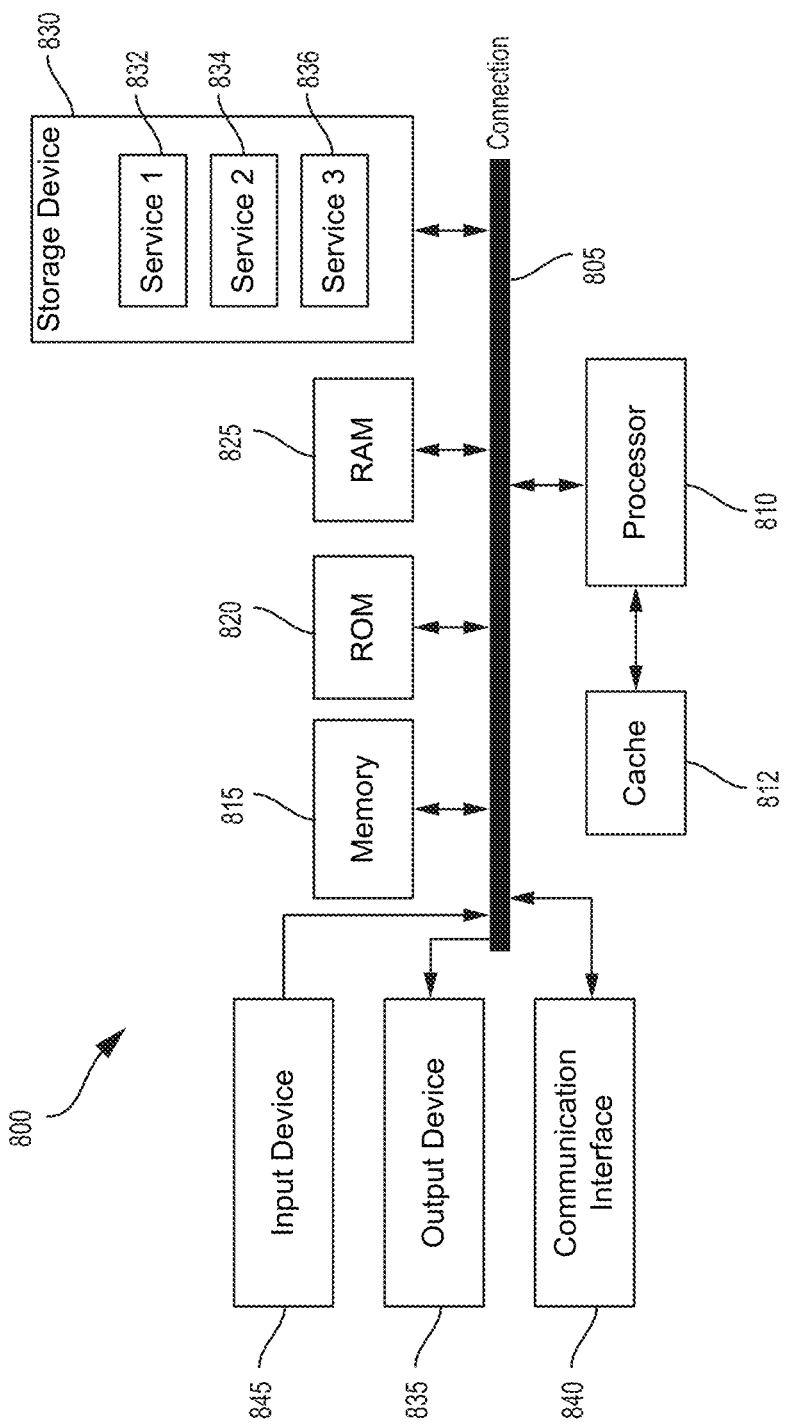
FIG. 8 is a diagram illustrating an example of a computing system for implementing certain aspects described herein.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some aspects, computing system 800 is a distributed system in which the functions described in this disclosure can be distributed within a datacenter, multiple data centers, a peer network, etc. In some cases, one or more of the described system components represents many such components each performing some or all of the function for which the component is described. In some aspects, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some aspects, a hardware service that performs a particular function can include the software component stored in a computer-readable medium in connection with the necessary hardware components, such as processor 810, connection 805, output device 835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method comprising: obtaining first sensor measurement data associated with a first time from one or more sensors; obtaining second sensor measurement data associated with a second time from the one or more sensors, the second time occurring after the first time; determining that the first sensor measurement data and the second sensor measurement data satisfy at least one batching condition; based on determining that the first sensor measurement data and the second sensor measurement data satisfy the at least one batching condition, generating a sensor measurement data batch including the first sensor measurement data, the second sensor measurement data, and at least one target sensor measurement data, the at least one target sensor measurement data occurring between the first time and the second time; and outputting the sensor measurement data batch.

Aspect 2: The method of Aspect 1, further comprising: obtaining the sensor measurement data batch; and based on the sensor measurement data batch, training a calibration model selector to select between two or more calibration policies.

Aspect 3: The method of any of Aspects 1 to 2, wherein training the calibration model selector comprises: obtaining calibrated measurement data corresponding to the sensor measurement data batch from a calibration model selected by the calibration model selector; determining an estimated orientation based on the calibrated measurement data; comparing the estimated orientation with a known orientation associated with the at least one batching condition; and based on comparing the estimated orientation with the known orientation, adjusting at least one parameter of the calibration model selector.

Aspect 4: The method of any of Aspects 1 to 3, wherein the known orientation comprises a relative orientation change between the first time and the second time determined based on the first sensor measurement data and the second sensor measurement data and the estimated orientation comprises a relative orientation change determined based on the at least one target sensor measurement data.

Aspect 5: The method of any of Aspects 1 to 4, wherein the known orientation is determined at least in part based on at least one of a first angle of arrival and a first time of flight of a first radio frequency signal at the first time with at least one of a second angle of arrival and a second time of flight of a second radio frequency signal at the second time.

Aspect 6: The method of any of Aspects 1 to 5, wherein the known orientation is determined based on at least one of a charging station status, a computer vision algorithm, an angle of arrival of a radio frequency signal, a time of flight of a radio frequency signal, and a Global Navigation Satellite System (GNSS) status.

Aspect 7: The method of any of Aspects 1 to 6, wherein the first sensor measurement data and the second sensor measurement data correspond to a same sensor orientation.

Aspect 8: The method of any of Aspects 1 to 7, wherein the known orientation is determined based on a relative orientation change between the first time and the second time.

Aspect 9: The method of any of Aspects 1 to 8, wherein determining that the first sensor measurement data and the second sensor measurement data satisfy the at least one batching condition comprises determining a known orientation based on the first sensor measurement data and the second sensor measurement data.

Aspect 10: The method of any of Aspects 1 to 9, further comprising: obtaining third sensor measurement data associated with a third time from the one or more sensors, the third time occurring after the second time; obtaining fourth sensor measurement data associated with a fourth time from the one or more sensors, the fourth time occurring after the third time; determining that the third sensor measurement data and the fourth sensor measurement data satisfy an additional batching condition; based on determining that the third sensor measurement data and the fourth sensor measurement data satisfy the additional batching condition, generating an additional sensor measurement batch including the third sensor measurement data, the fourth sensor measurement data, and at least an additional target sensor measurement data between the third time and the fourth time; and outputting the additional sensor measurement batch.

Aspect 11: A method comprising: obtaining a first plurality of sensor measurements; based on the first plurality of sensor measurements, performing a first calibration action on the first plurality of sensor measurements; obtaining a second plurality of sensor measurements; and based on the second plurality of sensor measurements, performing a second calibration action on the second plurality of sensor measurements, different from the first calibration action.

Aspect 12: The method of Aspect 11, further comprising performing the first calibration action based on first one or more features associated with the first plurality of sensor measurements and performing the second calibration action on the second plurality of sensor measurements based on second one or more features associated with the second plurality of sensor measurements.

Aspect 13: The method of any of Aspects 11 to 12, wherein the first one or more features associated with the first plurality of sensor measurements and the second one or more features associated with the second plurality of sensor measurements each comprise a statistical feature of a respective inertial sensor measurement.

Aspect 14: The method of any of Aspects 11 to 13, wherein the statistical feature comprises one or more of a mean, a variance, and a standard deviation.

Aspect 15: The method of any of Aspects 11 to 14, wherein the first one or more features associated with the first plurality of sensor measurements and the second one or more features associated with the second plurality of sensor measurements are determined by a machine learning model.

Aspect 16: The method of any of Aspects 11 to 15, wherein a machine learning model is configured to select performing the first calibration action on the first plurality of sensor measurements based on the first one or more features associated with the first plurality of sensor measurements and the machine learning model selects performing the second calibration action on the second plurality of sensor measurements based on the second one or more features associated with the second plurality of sensor measurements.

Aspect 17: The method of any of Aspects 11 to 16, wherein the machine learning model is trained according to a method comprising: obtaining first sensor measurement data associated with a first time from one or more sensors; obtaining second sensor measurement data associated with a second time from the one or more sensors, the second time occurring after the first time; determining that the first sensor measurement data and the second sensor measurement data satisfy at least one batching condition; based on determining that the first sensor measurement data and the second sensor measurement data satisfy the at least one batching condition, generating a sensor measurement data batch including the first sensor measurement data, the second sensor measurement data, and at least one target sensor measurement data, the at least one target sensor measurement data occurring between the first time and the second time; obtaining the sensor measurement data batch; and based on the sensor measurement data batch, training a calibration model selector to select between two or more calibration actions, wherein the two or more calibration actions comprise the first calibration action and the second calibration action.

Aspect 18: An apparatus for processing sensor measurement data, comprising: one or more processors operably configured to: obtain first sensor measurement data associated with a first time from one or more sensors, obtain second sensor measurement data associated with a second time from the one or more sensors, the second time occurring after the first time, determine, that the first sensor measurement data and the second sensor measurement data satisfy at least one batching condition, based on determine that the first sensor measurement data and the second sensor measurement data satisfy the at least one batching condition, generate a sensor measurement data batch including the first sensor measurement data, the second sensor measurement data, and at least one target sensor measurement data, the at least one target sensor measurement data occurring between the first time and the second time, and output the sensor measurement data batch.

Aspect 19: The apparatus of Aspect 18, wherein the one or more processors are configured to: obtain the sensor measurement data batch; and based on the sensor measurement data batch, train a calibration model selector to select between two or more calibration policies.

Aspect 20: The apparatus of any of Aspects 18 to 19, wherein the one or more processors are configured to: obtain calibrated measurement data corresponding to the sensor measurement data batch from a calibration model selected by the calibration model selector; determine an estimated orientation based on the calibrated measurement data; compare the estimated orientation with a known orientation associated with the at least one batching condition; and based on compare the estimated orientation with the known orientation, adjust at least one parameter of the calibration model selector.

Aspect 21: The apparatus of any of Aspects 18 to 20, wherein the known orientation comprises a relative orientation change between the first time and the second time determined based on the first sensor measurement data and the second sensor measurement data and the estimated orientation comprises a relative orientation change determined based on the at least one target sensor measurement data.

Aspect 22: The apparatus of any of Aspects 18 to 21, wherein the known orientation is determined at least in part based on at least one of a first angle of arrival and a first time of flight of a first radio frequency signal at the first time with at least one of a second angle of arrival and a second time of flight of a second radio frequency signal at the second time.

Aspect 23: The apparatus of any of Aspects 18 to 22, wherein the known orientation is determined based on at least one of a charging station status, a computer vision algorithm, an angle of arrival of a radio frequency signal, a time of flight of a radio frequency signal, and a Global Navigation Satellite System (GNSS) status.

Aspect 24: The apparatus of any of Aspects 18 to 23, wherein the first sensor measurement data and the second sensor measurement data correspond to a same sensor orientation.

Aspect 25: The apparatus of any of Aspects 18 to 24, wherein the known orientation is determined based on a relative orientation change between the first time and the second time.

Aspect 26: The apparatus of any of Aspects 18 to 25, wherein, to determine that the first sensor measurement data and the second sensor measurement data satisfy the at least one batching condition, the one or more processors are configured to determine a known orientation based on the first sensor measurement data and the second sensor measurement data.

Aspect 27: The apparatus of any of Aspects 18 to 26, wherein the one or more processors are configured to: obtain third sensor measurement data associated with a third time from the one or more sensors, the third time occur after the second time; obtain fourth sensor measurement data associated with a fourth time from the one or more sensors, the fourth time occur after the third time; determine that the third sensor measurement data and the fourth sensor measurement data satisfy an additional batching condition; based on determine that the third sensor measurement data and the fourth sensor measurement data satisfy the additional batching condition, generate an additional sensor measurement batch including the third sensor measurement data, the fourth sensor measurement data, and at least an additional target sensor measurement data between the third time and the fourth time; and output the additional sensor measurement batch.

Aspect 28: An apparatus for processing sensor measurement data, comprising: one or more processors operably configured to: obtain a first plurality of sensor measurements; based on the first plurality of sensor measurements, perform a first calibration action on the first plurality of sensor measurements; obtain a second plurality of sensor measurements; and based on the second plurality of sensor measurements, perform a second calibration action on the second plurality of sensor measurements, different from the first calibration action.

Aspect 29: The apparatus of Aspect 28, wherein the one or more processors are configured to: perform the first calibration action based on first one or more features associated with the first plurality of sensor measurements and perform the second calibration action on the second plurality of sensor measurements based on second one or more features associated with the second plurality of sensor measurements.

Aspect 30: The apparatus of any of Aspects 28 to 29, wherein the first one or more features associated with the first plurality of sensor measurements and the second one or more features associated with the second plurality of sensor measurements each comprise a statistical feature of a respective inertial sensor measurement.

Aspect 31: The apparatus of any of Aspects 28 to 30, wherein the statistical feature comprises one or more of a mean, a variance, and a standard deviation.

Aspect 32: The apparatus of any of Aspects 28 to 31, wherein the first one or more features associated with the first plurality of sensor measurements and the second one or more features associated with the second plurality of sensor measurements are determined by a machine learning model.

Aspect 33: The apparatus of any of Aspects 28 to 32, wherein a machine learning model is configured to select performing the first calibration action on the first plurality of sensor measurements based on the first one or more features associated with the first plurality of sensor measurements and the machine learning model selects performing the second calibration action on the second plurality of sensor measurements based on the second one or more features associated with the second plurality of sensor measurements.

Aspect 34: The apparatus of any of Aspects 28 to 33, wherein the machine learning model is trained according to a method comprising: obtaining first sensor measurement data associated with a first time from one or more sensors; obtaining second sensor measurement data associated with a second time from the one or more sensors, the second time occurring after the first time; determining that the first sensor measurement data and the second sensor measurement data satisfy at least one batching condition; based on determining that the first sensor measurement data and the second sensor measurement data satisfy the at least one batching condition, generating a sensor measurement data batch including the first sensor measurement data, the second sensor measurement data, and at least one target sensor measurement data, the at least one target sensor measurement data occurring between the first time and the second time; obtaining the sensor measurement data batch; and based on the sensor measurement data batch, training a calibration model selector to select between two or more calibration actions, wherein the two or more calibration actions comprise the first calibration action and the second calibration action.

Aspect 35: A non-transitory computer-readable storage medium having stored thereon instructions which, when executed by one or more processors, cause the one or more processors to perform any of the operations of aspects 1 to 17.

Aspect 36: An apparatus comprising means for performing any of the operations of aspects 1 to 17.

Aspect 37: A method comprising operations according to any of Aspects 1-10 and any of Aspects 11-17.

Aspect 38: An apparatus for processing sensor measurement data. The apparatus includes one or more processors (e.g., one processor or multiple processors). The one or more processors are configured to perform operations according to any of Aspects 1-10 and any of Aspects 11-17.

Aspect 39: A computer-readable storage medium storing instructions that, when executed by one or more processors, cause the one or more processors to perform operations according to any of Aspects 1 to 10 and any of Aspects 11 to 17.

Aspect 40: An apparatus comprising means for performing operations according to any of Aspects 1 to 10 and any of Aspects 11 to 17.

What is claimed is:

1. A method comprising:
obtaining first sensor measurement data associated with a first time from one or more sensors of a device;
obtaining second sensor measurement data associated with a second time from the one or more sensors of the device, the second time occurring after the first time;
determining, by a data batching engine, that the first sensor measurement data and the second sensor measurement data satisfy at least one batching condition;
based on determining that the first sensor measurement data and the second sensor measurement data satisfy the at least one batching condition, generating, by the data batching engine, a sensor measurement data batch including the first sensor measurement data and the second sensor measurement data, wherein the data batch is associated with at least one target sensor measurement data from a target sensor of the device, the at least one target sensor measurement data occurring between the first time and the second time;
selecting, by a calibration policy engine based on the data batch, a calibration model for calibrating the at least one target sensor measurement data; and
generating, by the calibration model, calibrated target sensor data based on the at least one target sensor measurement data.

2. The method of claim 1, further comprising:
comparing the calibrated target sensor data with an expected target sensor data, wherein the expected target sensor data is determined based on the data batch; and
adjusting, by a training engine based on comparing the calibrated target sensor data with the expected target sensor data, one or more parameters of the calibration policy engine.

3. The method of claim 2, further comprising:
determining an estimated orientation based on the calibrated target sensor data;
comparing the estimated orientation with a known orientation associated with the data batch; and
based on comparing the estimated orientation with the known orientation, adjusting the one or more parameters of the calibration policy engine.

4. The method of claim 3, wherein the known orientation comprises a relative orientation change between the first time and the second time determined based on the first sensor measurement data and the second sensor measurement data and the estimated orientation comprises a relative orientation change determined based on the at least one target sensor measurement data.

5. The method of claim 4, wherein the known orientation is determined at least in part based on at least one of a first angle of arrival and a first time of flight of a first radio frequency signal at the first time with at least one of a second angle of arrival and a second time of flight of a second radio frequency signal at the second time.

6. The method of claim 3, wherein the known orientation is determined based on at least one of a charging station status, a computer vision algorithm, an angle of arrival of a radio frequency signal, a time of flight of a radio frequency signal, and a Global Navigation Satellite System (GNSS) status.

7. The method of claim 1, wherein determining that the first sensor measurement data and the second sensor measurement data satisfy the at least one batching condition comprises determining a known orientation based on the first sensor measurement data and the second sensor measurement data.

8. The method of claim 6, wherein the first sensor measurement data and the second sensor measurement data correspond to a same sensor orientation.

9. The method of claim 8, wherein the known orientation is determined based on a relative orientation change between the first time and the second time.

10. The method of claim 1, further comprising:
obtaining third sensor measurement data associated with a third time from the one or more sensors of the device, the third time occurring after the second time;
obtaining fourth sensor measurement data associated with a fourth time from the one or more sensors of the device, the fourth time occurring after the third time;
determining, by the data batching engine, that the third sensor measurement data and the fourth sensor measurement data satisfy an additional batching condition;
based on determining that the third sensor measurement data and the fourth sensor measurement data satisfy the additional batching condition, generating an additional sensor measurement batch including the third sensor measurement data, the fourth sensor measurement data, and at least an additional target sensor measurement data between the third time and the fourth time; and
outputting the additional sensor measurement batch.

11. An apparatus for processing sensor measurement data, comprising:
one or more processors operably configured to:
obtain first sensor measurement data associated with a first time from one or more sensors of a device;
obtain second sensor measurement data associated with a second time from the one or more sensors of the device, the second time occurring after the first time;
determine, by a data batching engine, that the first sensor measurement data and the second sensor measurement data satisfy at least one batching condition;
based on determining that the first sensor measurement data and the second sensor measurement data satisfy the at least one batching condition, generate, by the data batching engine, a sensor measurement data batch including the first sensor measurement data, the second sensor measurement data, wherein the data batch is associated with at least one target sensor measurement data from a tar et sensor of the device, the at least one target sensor measurement data occurring between the first time and the second time;
select, by a calibration policy engine based on the data batch, a calibration model for calibrating at least one target sensor measurement data; and
generate, by the calibration model, calibrated target sensor data based on the at least one target sensor measurement data.

12. The apparatus of claim 11, wherein the one or more processors are configured to:
compare the calibrated target sensor data with an expected target sensor data determined based on the data batch; and
adjust, by a training engine based on comparing the calibrated target sensor data with the expected target sensor data, one or more parameters of the calibration policy engine.

13. The apparatus of claim 12, wherein the one or more processors are configured to:
determine an estimated orientation based on the calibrated target sensor data;
compare the estimated orientation with a known orientation associated with the data batch; and
based on compare the estimated orientation with the known orientation, adjust the one or more parameters of the calibration policy engine.

14. The apparatus of claim 13, wherein the known orientation comprises a relative orientation change between the first time and the second time determined based on the first sensor measurement data and the second sensor measurement data and the estimated orientation comprises a relative orientation change determined based on the at least one target sensor measurement data.

15. The apparatus of claim 14, wherein the known orientation is determined at least in part based on at least one of a first angle of arrival and a first time of flight of a first radio frequency signal at the first time with at least one of a second angle of arrival and a second time of flight of a second radio frequency signal at the second time.

16. The apparatus of claim 13, wherein the known orientation is determined based on at least one of a charging station status, a computer vision algorithm, an angle of arrival of a radio frequency signal, a time of flight of a radio frequency signal, and a Global Navigation Satellite System (GNSS) status.

17. The apparatus of claim 16, wherein the first sensor measurement data and the second sensor measurement data correspond to a same sensor orientation.

18. The apparatus of claim 17, wherein the known orientation is determined based on a relative orientation change between the first time and the second time.

19. The apparatus of claim 11, wherein, to determine that the first sensor measurement data and the second sensor measurement data satisfy the at least one batching condition, the one or more processors are operably configured to determine a known orientation based on the first sensor measurement data and the second sensor measurement data.

20. The apparatus of claim 11, wherein the one or more processors are configured to:
obtain third sensor measurement data associated with a third time from the one or more sensors of the device, the third time occur after the second time;
obtain fourth sensor measurement data associated with a fourth time from the one or more sensors of the device, the fourth time occur after the third time;
determine, by the data batching engine, that the third sensor measurement data and the fourth sensor measurement data satisfy an additional batching condition;
based on determine that the third sensor measurement data and the fourth sensor measurement data satisfy the additional batching condition, generate an additional sensor measurement batch including the third sensor measurement data, the fourth sensor measurement data, and at least an additional target sensor measurement data between the third time and the fourth time; and
output the additional sensor measurement batch.

21. A non-transitory computer-readable medium having stored thereon instructions that, when executed by one or more processors, cause the one or more processors to:
obtain first sensor measurement data associated with a first time from one or more sensors of a device;
obtain second sensor measurement data associated with a second time from the one or more sensors of the device, the second time occurring after the first time;
determine, by a data batching engine, that the first sensor measurement data and the second sensor measurement data satisfy at least one batching condition;
based on determining that the first sensor measurement data and the second sensor measurement data satisfy the at least one batching condition, generate, by the data batching engine, a sensor measurement data batch including the first sensor measurement data, the second sensor measurement data, wherein the data batch is associated with at least one target sensor measurement data from a target sensor of the device, the at least one target sensor measurement data occurring between the first time and the second time;
select, by a calibration policy engine based on the data batch, a calibration model for calibrating at least one target sensor measurement data; and
generate, by the calibration model, calibrated target sensor data based on the at least one target sensor measurement data.

22. The non-transitory computer-readable medium of claim 21, further comprising instructions that, when executed by the one or more processors, cause the one or more processors to:
compare the calibrated target sensor data with an expected target sensor data determined based on the data batch; and adjust, by a training engine based on comparing the calibrated target sensor data with the expected target sensor data, one or more parameters of the calibration policy engine.

23. The non-transitory computer-readable medium of claim 22, further comprising instructions that, when executed by the one or more processors, cause the one or more processors to:
determine an estimated orientation based on the calibrated target sensor data;
compare the estimated orientation with a known orientation associated with the data batch; and
based on compare the estimated orientation with the known orientation, adjust the one or more parameters of the calibration policy engine.

24. The non-transitory computer-readable medium of claim 23, wherein the known orientation comprises a relative orientation change between the first time and the second time determined based on the first sensor measurement data and the second sensor measurement data and the estimated orientation comprises a relative orientation change determined based on the at least one target sensor measurement data.

25. The non-transitory computer-readable medium of claim 24, wherein the known orientation is determined at least in part based on at least one of a first angle of arrival and a first time of flight of a first radio frequency signal at the first time with at least one of a second angle of arrival and a second time of flight of a second radio frequency signal at the second time.

26. The non-transitory computer-readable medium of claim 23, wherein the known orientation is determined based on at least one of a charging station status, a computer vision algorithm, an angle of arrival of a radio frequency signal, a time of flight of a radio frequency signal, and a Global Navigation Satellite System (GNSS) status.

27. The non-transitory computer-readable medium of claim 26, wherein the first sensor measurement data and the second sensor measurement data correspond to a same sensor orientation.

28. The non-transitory computer-readable medium of claim 27, wherein the known orientation is determined based on a relative orientation change between the first time and the second time.

29. The non-transitory computer-readable medium of claim 21, wherein, to determine that the first sensor measurement data and the second sensor measurement data satisfy the at least one batching condition, the instructions, when executed by the one or more processors, cause the one or more processors to determine a known orientation based on the first sensor measurement data and the second sensor measurement data.

30. The non-transitory computer-readable medium of claim 21, further comprising instructions that, when executed by the one or more processors, cause the one or more processors to:
obtain third sensor measurement data associated with a third time from the one or more sensors of the device, the third time occur after the second time;
obtain fourth sensor measurement data associated with a fourth time from the one or more sensors of the device, the fourth time occur after the third time;
determine, by the data batching engine, that the third sensor measurement data and the fourth sensor measurement data satisfy an additional batching condition;
based on determine that the third sensor measurement data and the fourth sensor measurement data satisfy the additional batching condition, generate an additional sensor measurement data batch including the third sensor measurement data, the fourth sensor measurement data, and at least an additional target sensor measurement data between the third time and the fourth time; and
output the additional sensor measurement data batch.

* * * * *